May 20, 1952     J. H. COOK     2,596,984
PULSE SYSTEM
Filed Feb. 19, 1945

INVENTOR.
JACKSON H. COOK
BY
William D. Hall
Attorney

Patented May 20, 1952

2,596,984

UNITED STATES PATENT OFFICE 2,596,984

PULSE SYSTEM

Jackson H. Cook, Morristown, N. J., assignor, by mesne assignments, to the United States of America as represented by the Secretary of War Application February 19, 1945, Serial No. 578,763

11 Claims. (Cl. 320—1)

The present invention relates to electronic systems and more particularly to means for amplifying and applying pulses of short duration to a suitable load.

Many uses have arisen for electronic systems in which high voltage pulses are applied to loads of various kinds. One such system consists of a high voltage source with a switch adapted to periodically connect the load in series with the source. These systems have suffered from various disadvantages, the chief disadvantage being that the switching apparatus, the load or source of power of such systems must be maintained at a potential considerably above or below ground potential. Such disadvantage makes these systems particularly impractical where the switching apparatus incorporated in them is an electronic device. With voltages in the range of 10 kilovolts or more, the amount and type of insulation that would be required for filament leads and the mounting of electronic tubes would be prohibitive.

One object of this invention, therefore, is to provide means for applying high voltage pulses of relatively short time duration to a suitable load in which one side of the load, one side of the switching apparatus, and one side of the source of power may be maintained at ground potential.

In accordance with the present invention there is provided electrical apparatus comprising a source of electrical energy and electrical storage means. The source of electrical energy and the storage means are connected in such a manner as to permit storage of electrical energy from the source of electric energy in the storage means. The switching means is also provided and is associated with the storage means to permit the discharge of at least a portion of the energy stored in the storage means.

For a better understanding of the invention, together with other and further objects thereof, reference is made to the following description, taken in connection with the accompanying drawings, and the scope of the invention will be pointed out in the appended claims.

Figure 1:
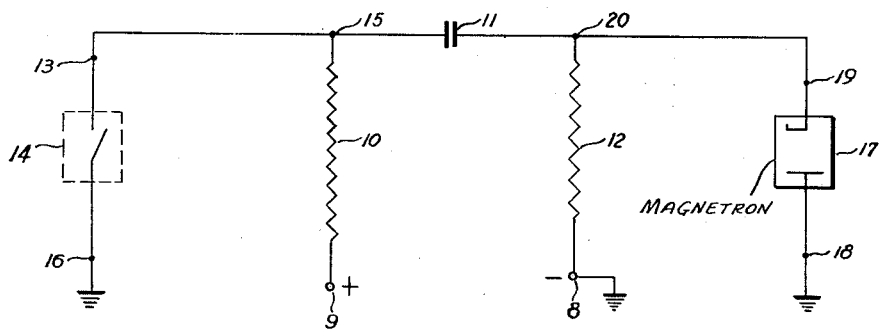
Fig. 1 illustrates the basic circuit of the invention.

Referring now more particularly to Fig. 1, there is shown a series charging circuit including terminals 8 and 9 of a power supply, a resistor 10, a storage capacitor 11, and a charging resistor 12. One terminal 13 of switching apparatus 14 is connected to the point 15 between resistor 10 and capacitor 11. A second terminal 16 of switching apparatus 14 is connected to ground. The switching apparatus mentioned above may be either electronic or mechanical in nature. Two embodiments of the invention will be shown; one using a mechanical switching apparatus and one using an electronic switching apparatus. For sake of ease of explanation the mechanical switching apparatus is described first. Terminal 18 of load 17 is grounded while a second terminal 19 is connected to the point 20 between capacitor 11 and resistor 12. Terminal 8 of the power supply may be grounded. In the example shown the negative terminal of the power supply is grounded, but the connections to the power supply could be reversed if a pulse of the opposite polarity was desired at load 17. The storage capacitor 11 should be of sufficient size so that it loses only a small fraction of its total charge when the pulse is applied to the load. This is possible due to the impedance of the load circuit, and extremely short pulses normally employed in this type of an arrangement. In this specification a short pulse is one that has a time duration that is small when compared to the R. C. time constant of the discharge circuit. As an example, one set of circuit constants that would operate satisfactorily would be a capacitor of .2 to .5 microfarads, at load impedance of approximately 1000 ohms and a pulse duration of one microsecond. One type of load that has been used successfully with this system is a high frequency oscillator of the magnetron type.

The operation of the system is as follows: With switch 14 open current flows from the positive terminal 9 of the power supply through resistor 10, through capacitor 11 and returns to the negative terminal 8 of the power supply through resistor 12. Sufficient time is allowed between pulses for condenser 11 to charge to approximately the full power supply voltage. When capacitor 11 is fully charged, no current will flow through resistor 10, so junction point 15 will be at the same potential as the positive terminal of the power supply. Resistor 12 carries no current after the capacitor 11 is fully charged so terminal 20 is at ground potential. When switch 14 is closed, junction 15 is placed at ground potential. This causes junction 20 to be placed at a potential below ground equal to the potential existing across capacitor 11 at the instant switch 14 was closed. Storage capacitor 11 now supplies energy to the load through the following path;

from ground to terminal 16, through switch 14, through capacitor 11 to terminal 19 of the load 17, thence through the load 17 to terminal 18 and ground. Resistor 10 is sufficiently large to prevent damage to the power supply when junction point 15 is placed at ground potential. Resistor 12 is large in comparison to the impedance of the load during the time the load is being pulsed. A very short time after switch 14 is closed, it is again opened. This restores terminal 20 to approximately ground potential. In addition to providing a path for charging capacitor 11, resistor 12 also serves as a discharge path for stray capacitances in the load. The charge on capacitor 11 is restored in the manner described in the initial charging operation. In this explanation resistors 10 and 12 were used for sake of example but either or both may be replaced by inductances, as will be shown hereinafter; by a combination of resistors and inductances; or by any impedance capable of performing the functions stated in the above explanation can be used in place of resistors 10 and 12.

Figure 2:
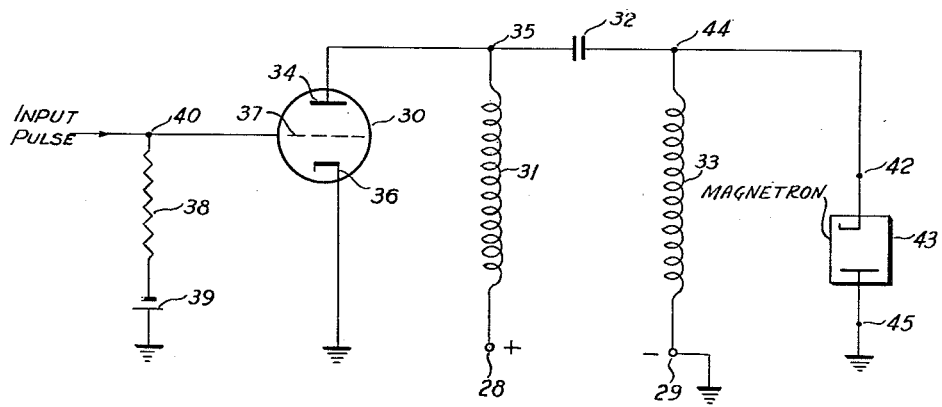
Fig. 2 shows the application of the basic circuit using a thermionic switching tube.

Referring now to Fig. 2, there is illustrated a form of the invention in which vacuum tube 30 replaces switch 14 of Fig. 1 as its full equivalent. The charging circuit in this example consists of terminals 28 and 29 of a power supply, an isolating inductance 31, a storage capacitor 32 and an isolating inductance 33 all in series.

Anode 34 of vacuum tube 30 is connected to the point 35 between inductance 31 and capacitor 32. Cathode 36 of tube 30 is shown connected to ground. Control grid 37 of tube 30 is connected through a grid resistor 38 to a bias source 39, the positive side of said bias source being at ground potential. The point 40 between control grid 37 and grid resistor 38 is adapted to receive an input signal in the form of a positive pulse to be applied between this point 40 and ground.

The terminal 42 of load 43 is connected to the point 44 between capacitor 32 and inductance 33. A second terminal 45 of the load is connected to ground.

The operation of this circuit is essentially the same as that of the circuit shown in Fig. 1 except for the operation of vacuum tube 30. In this example, bias source 39 is of sufficient potential to maintain grid 37 below the point of plate current cut-off in the absence of a signal on grid 37. At predetermined times a signal in the form of a positive pulse is applied at terminal 40. This pulse should be of sufficient magnitude to drive grid 37 to a potential somewhat above the potential of cathode 36 and should be of a time duration equal to the time duration of the pulse applied to the load. When tube 30 is cut off the circuit between anode 34 and cathode 36 is effectively opened. When a positive pulse is applied to grid 37, the impedance from anode 34 to cathode 36 is low and the tube acts as a closed switch. If a vacuum tube is used as a switch, as in this example, the negative terminal 29 of the power supply should be grounded. In this example, inductance 33 provides a charging path for capacitor 32 and, in addition, the voltage induced across this element during the pulse causes the pulse applied to the load to fall off rapidly when the switching device is opened.

It will be appreciated that there may be departures from the particular showing hereinbefore described that fall fairly within the spirit and scope of the invention and I claim all such equivalent arrangements as fall within the invention as identified in the hereinafter appended claims.

I claim:

1. Electrical apparatus comprising electrical energy storage means, a power supply, a load including an electron tube having at least a cathode and an anode connected directly to a point of reference potential, means coupled to said power supply for effecting the storing of energy in said electrical storage means, a switching means for effecting the transfer of at least a portion of the energy stored in said electrical energy storage means to said load; and means for connecting one side of said power supply and one side of said switch means to the same point of reference potential as the anode of said electron tube.

2. A pulse amplifier comprising electrical energy storage means, a power supply connected in series therewith for supplying energy thereto, said power supply having one side thereof connected to a point of reference potential, a load including an electron tube having at least a cathode and anode, means for connecting said cathode to one side of said storage means, means for connecting said anode directly to said point of reference potential, means for introducing a pulse to be amplified, a switching means responsive to said pulse effecting the transfer of at least a portion of the energy stored in said storage means to said load, said switching means being connected between the other side of said storage means and said point of reference potential.

3. Electrical apparatus comprising an electrical energy storage means; a charging circuit for said energy storage means including a source of direct current potential having a given value with respect to a point of reference potential, and bilaterally conductive impedance means directly connecting said energy storage means across said source of direct current potential; and a discharging circuit for said energy storage means including a load connected between a first side of said energy storage means and said point of reference potential, and a path including a normally open switching means for connecting a second side of said energy storage means to said point of reference potential, whereby the closing of said switching means is effective in transferring energy from said energy storage means to said load.

4. Electrical apparatus according to claim 3, wherein said bilaterally conductive impedance means includes a first resistance interconnecting said first side of said energy storage means and said point of reference potential, and a second resistance interconnecting said second side of said energy storage means and said source of direct current voltage.

5. Electrical apparatus according to claim 4, wherein said first resistance is large in comparison to the impedance of said load when energy is being transferred to said load.

6. Electrical apparatus according to claim 3, wherein said switching means comprises an electron tube having at least a cathode, a control-electrode, and an anode; a source of negative bias voltage; means for connecting said bias voltage in the cathode-control-electrode circuit of said tube for maintaining the non-conduction thereof; and means for impressing a positive pulse on the cathode-control-electrode circuit of said tube to effect the conduction therethrough during the time interval of said pulse.

7. Electrical apparatus according to claim 3, wherein said load comprises an electron tube having at least a cathode and an anode connected directly to said point of reference potential.

8. Electrical apparatus according to claim 7, wherein said electron tube is a magnetron and said point of reference potential is grounded.

9. Electrical apparatus according to claim 1, wherein said point of reference potential is grounded.

10. Electrical apparatus comprising an electrical energy storage means; a charging circuit for said energy storage means including a source of direct current potential having a given positive value with respect to ground, a first inductance directly connecting a first side of said energy storage means to ground, and a second inductance directly connecting a second side of said energy storage means to said source of direct current potential; and a discharging circuit for said energy storage means including a unidirectionally conductive load connected between said first side of said energy storage means and ground, said load being conductive only when the potential at said first side of said energy storage means has a negative value with respect to ground, and a switching means connected between said second side of said energy storage means and ground, said switching means including an electron tube having an anode, cathode and control electrode, said anode connected to said second side of said energy storage means, said cathode connected to ground, means interconnecting said control electrode and said cathode for negatively biasing said electron tube to cut-off, and means for applying a positive pulse to said control electrode to effect the conduction of said electron tube during the interval of said pulse.

11. Electrical apparatus according to claim 10, wherein the impedance of said first inductance is large in comparison to the impedance of said load when energy is being transferred to said load.

JACKSON H. COOK.

REFERENCES CITED

The following references are of record in the file of this patent:

UNITED STATES PATENTS

| Number | Name | Date |
| --- | --- | --- |
| 1,168,346 | Thomson | Jan. 18, 1916 |
| 1,299,150 | Dyer | Apr. 1, 1919 |
| 2,147,472 | Ulrey | Feb. 14, 1939 |
| 2,359,178 | White | Sept. 26, 1944 |
| 2,405,069 | Tonks | July 30, 1946 |
| 2,411,898 | Schelleng | Dec. 3, 1946 |
| 2,416,718 | Schockley | Mar. 4, 1947 |